United States Patent
Yoon et al.

(10) Patent No.: US 7,149,157 B2
(45) Date of Patent: Dec. 12, 2006

(54) METHOD AND APPARATUS TO CONTROL A STEP MOTOR OF AN OPTICAL DISK DRIVING SYSTEM

(75) Inventors: Yong-seock Yoon, Gyeonggi-do (KR); Soo-yul Jung, Gyeonggi-do (KR); Dong-ki Hong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 828 days.

(21) Appl. No.: 10/350,179

(22) Filed: Jan. 24, 2003

(65) Prior Publication Data

US 2004/0004911 A1    Jan. 8, 2004

(30) Foreign Application Priority Data

Jul. 5, 2002    (KR)    ............... 10-2002-0038879

(51) Int. Cl.
G11B 21/08    (2006.01)
(52) U.S. Cl. ................... 369/30.1; 369/53.29
(58) Field of Classification Search ............... None
See application file for complete search history.

(56) References Cited

U.S. PATENT DOCUMENTS 5,012,460 A * 4/1991 Popovich et al. ........ 369/30.13
6,590,843 B1 * 7/2003 Zhuang ................... 369/44.32

FOREIGN PATENT DOCUMENTS

| JP | 63-096782 | 4/1988 |
|----|-----------|--------|
| JP | 09-073742 | 3/1997 |
| JP | 09-180203 | 7/1997 |
| JP | 10-312546 | 11/1998 |
| JP | 10-334624 | 12/1998 |
| JP | 2001-67825 | 3/2001 |

* cited by examiner

Primary Examiner—Paul Huber
(74) Attorney, Agent, or Firm—Stein, McEwen & Bui, LLP

(57) ABSTRACT

An apparatus to control a step motor in an optical disk driving system to move a sled which transfers a pickup unit, including a playing unit, a coarse search unit, and a driving unit. The playing unit generates a first step pulse at a first interval of time set by a disk speed according to a comparison between a sled control signal and a tracking driving signal in a playing mode with a predetermined threshold. The coarse search unit generates a second step pulse at a second interval of time stored in a table according to a number of motion steps and a motion direction corresponding to an amount of motion of the pickup unit due to operations in a search mode. The driving unit drives the step motor based on the first and second step pulses.

38 Claims, 3 Drawing Sheets

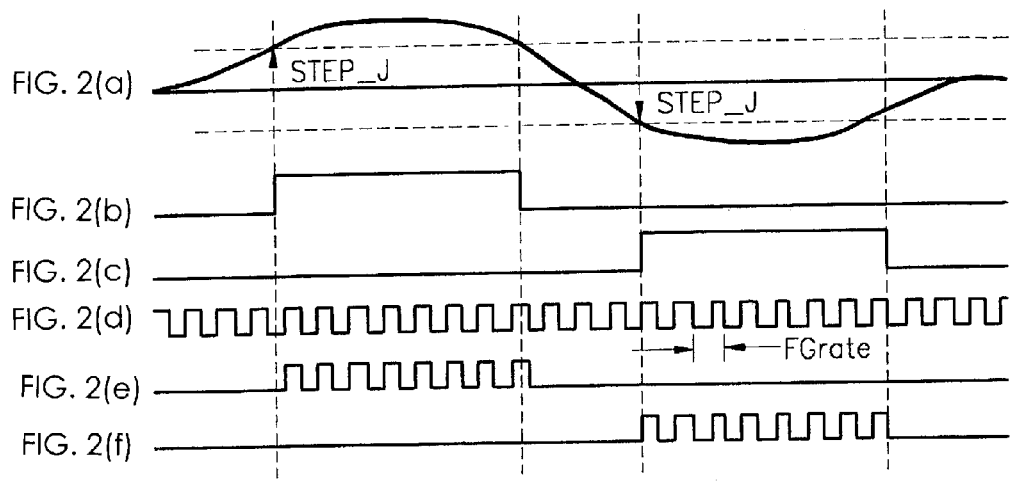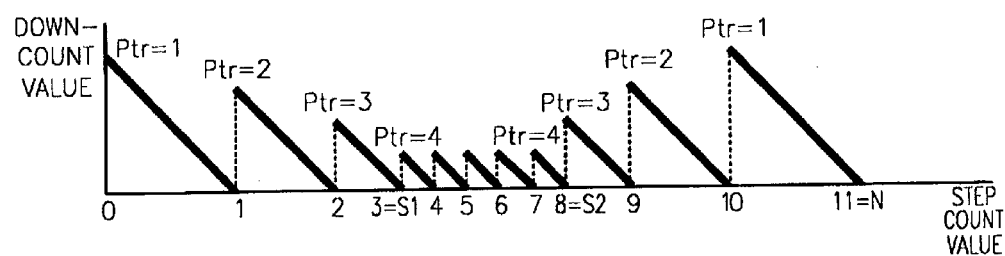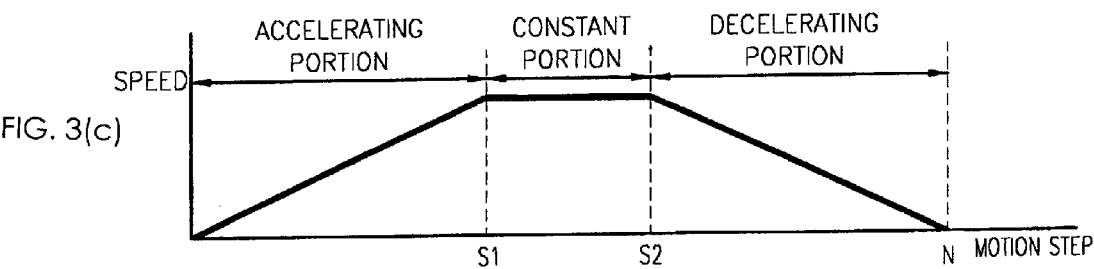

METHOD AND APPARATUS TO CONTROL A STEP MOTOR OF AN OPTICAL DISK DRIVING SYSTEM

CROSS-REFERENCE TO RELATED APPLICATIONS

This application claims the benefit of Korean Application No. 2002-38879, filed Jul. 5, 2002, in the Korean Intellectual Property Office, the disclosure of which is incorporated herein by reference.

BACKGROUND OF THE INVENTION

1. Field of the Invention

The present invention relates to a method of controlling a step motor of an optical disk driving system and an apparatus for the same, and more particularly, to a method of controlling a step motor by varying a frequency according to a disk speed in a playing mode and by using multiple voltages according to a driving mode, and an apparatus for the same.

2. Description of the Related Art

A step motor is widely used to move a sled transferring a pickup in an optical disk driving system. The pickup moves between an inner circumference and an outer circumference of an optical disk by controlling the step motor, which moves the sled in a playing mode and a search mode for a track seek and a track jump.

A conventional apparatus to control the step motor drives the step motor using a microprocessor which calculates a playing speed according to a disk speed and also drives the step motor by using a vector table in both the playing mode and the search mode. As the disk speed increases in the playing mode, a load on the microprocessor using an interrupt also increases. Further, the same vector table is used to determine a phase of the step motor regardless of the driving mode (the playing mode or the search mode), which causes much consumption of power and generation of heat.

SUMMARY OF THE INVENTION

According to an aspect of the present invention, there is provided a method and apparatus to control a step motor so as to reduce a load on a microprocessor in an optical disk driving system.

It is another aspect of the present invention to provide a method to control a step motor by varying an interval of time (a frequency rate) to determine a playing speed according to a disk speed in an optical disk driving system.

According to another aspect of the present invention, there is provided a method to control a step motor using multiple voltages according to a driving mode and an apparatus for the same in an optical disk system.

Additional aspects and advantages of the invention will be set forth in part in the description which follows and, in part, will be obvious from the description, or may be learned by practice of the invention.

To achieve the above and/or other aspects, the present invention provides a method to control a step motor of an optical disk driving system, the step motor moving a sled which transfers a pickup including: generating a first step pulse to control the step motor in a first interval of time, wherein the first interval of time is determined by setting a playing speed according to a disk speed in a playing mode; generating a second step pulse in a second interval of time, where the second step pulse is stored in a predetermined speed table according to a number of motion steps, and a motion direction corresponding to movements of the pickup due to search mode operations; and generating a driving signal of the step motor corresponding to the first step pulse or the second step pulse according to a driving mode.

According to an aspect of the present invention, the first interval of time is set to decrease as the disk speed increases by varying a frequency of the optical driving system according to a type of the disk or the disk speed.

To achieve the above and/or other aspects, the present invention provides a method to control a step motor of an optical disk driving system, the step motor moving a sled which transfers a pickup including: generating a first step pulse to control the step motor in a first interval of time determined according to a disk speed in a playing mode by using a frequency; generating a second step pulse in a second interval of time, where the second step pulse is stored in a predetermined speed table according to a number of motion steps, and a motion direction corresponding to movements of the pickup due to search mode operations; and applying a driving signal corresponding to the first step pulse or the second step pulse to the step motor using a voltage produced by adjusting an output of the step motor according to a playing/search mode.

Here, applying a driving signal corresponding to the first step pulse or the second step pulse to the step motor further includes selecting the first step pulse or the second step pulse according to the playing/search mode; reading out vector data of a step angle according to the first step pulse or the second step pulse selected from a first storage unit, where the vector data includes a step angle to control a full step in a playing mode, or from a second storage unit, where the vector data includes the step angle to control the full step in a search mode; and generating the vector data of the step angle read in the reading vector data into a driving signal of the step motor. In addition, the second storage unit stores step angle vector data having an output voltage of a predetermined large value to control the full step in the search mode requiring a rapid speed and a big torque, and the first storage unit stores the step angle vector data having an output voltage of a smaller value than the output voltage of the vector data stored in the second storage unit to control a micro step.

According to another aspect of the present invention, there is provided an optical disk driving system including a step motor moving a sled which transfers a pickup unit including: a playing unit generating a first step pulse to drive the step motor in a first interval of time, wherein the first interval of time is determined by setting a playing speed according to a disk speed in a playing mode; a coarse search unit generating a second step pulse in a second interval of time stored in a predetermined speed table, according to a number of motion steps and a motion direction corresponding to movements of the pickup due to search mode operations; and a motor driving unit applying a driving signal corresponding to the first step pulse or the second step pulse to the step motor by using a voltage produced by adjusting an output of the step motor according to a playing/search mode.

According to another aspect of the present invention, there is provided an apparatus to control a step motor in an optical disk driving system to move a sled which transfers a pickup unit, including: a playing unit generating a first step pulse at a first interval of time set by a disk speed according to a comparison between a sled control signal and a tracking driving signal in a playing mode with a predetermined threshold; a coarse search unit generating a second step pulse at a second interval of time, where the second step pulse is stored in a table according to a number of motion steps, and a motion direction corresponding to an amount of motion of the pickup unit due to operations in a search mode; and a driving unit driving the step motor based on the first and second step pulses.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 2(a) through 2(f) show waveforms outputted by the playing unit shown in FIG. 1;

FIGS. 3(a) through 3(c) are views illustrating a method of controlling a speed of a step motor by using a speed table of a coarse search unit as shown in FIG. 1.

DETAILED DESCRIPTION OF THE PREFERRED EMBODIMENTS

Figure 1:
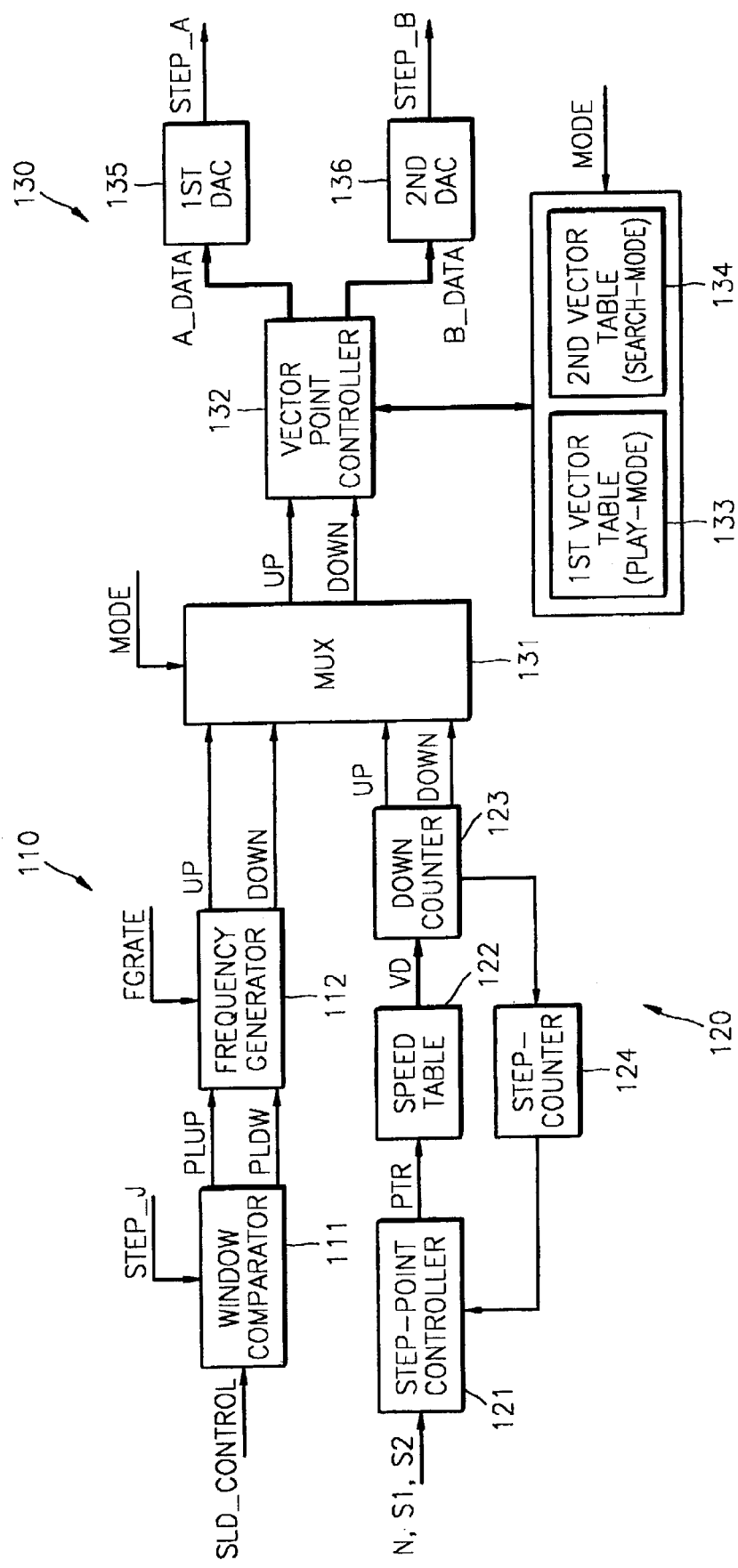
FIG. 1A is a block diagram of an apparatus for controlling a step motor in an optical disk driving system, according to an aspect of the present invention.

Reference will now be made in detail to the present preferred embodiments of the present invention, examples of which are illustrated in the accompanying drawings, wherein like reference numerals refer to like elements throughout.

FIG. 1 is a block diagram of an apparatus for controlling a step motor in an optical disk driving system, according to an aspect of the present invention. The apparatus includes a playing unit 110, a coarse search unit 120, and a motor driving unit 130. The playing unit 110 assists a track search and generates a step pulse at an interval of time set by a disk speed according to a result of comparing a sled control signal obtained by low-pass filtering and a tracking driving signal in a playing mode with a predetermined threshold. The coarse search unit 120 generates a step pulse at an interval of time stored in a speed table according to a number of motion steps and a motion direction corresponding to an amount of motion of a pickup due to operations, such as a track search and a track jump in a search mode. The driving unit 130 applies a driving signal which drives the step motor based on the generated step pulses from the playing unit 110 and the coarse search unit 120. In other words, the playing unit 110 and the coarse search unit 120 generate the step pulse, which indicates a direction in which the step motor should move and the amount of motion according to a predetermined algorithm. The driving unit 130 generates an analog value for a step angle corresponding to the generated step pulse to finally output exciter control signals, i.e., Step_A and Step_B.

Operations of the apparatus for controlling the step motor illustrated in FIG. 1 will now be described in connection with FIGS. 2(a) through 4.

Referring to FIG. 1, the playing unit 110 not only performs a playing operation based on the disk speed but also generates the step pulse corresponding to a sequence read and a stop motion. A window comparator 111 may include a software register, and compares a sled control signal (Sld_Control) shown in FIG. 2(a) with a predetermined threshold (Step_j) to generate a first window signal (PLUP) as shown in FIG. 2(b) if the sled control signal (Sld_Control) is equal to or higher than the threshold (Step_j), and generates a second window signal (PLDW) as shown in FIG. 2(c) if the sled control signal (Sld_Control) is equal to or lower than the threshold (Step_j). Here, the sled control signal (Sld_Control) is obtained by low-pass filtering the tracking driving signal (also called a tracking control signal) outputted from a tracking servo.

A frequency generator 112 generates an up pulse signal (UP) to drive the step motor toward the outer circumference, as shown in FIG. 2(e), during a period of the first window signal (PLUP) in FIG. 2(b) at a predetermined interval of time (FGrate) according to the disk speed shown in FIG. 2(d), if the window comparator 111 keeps outputting the sled signal (Sld_Control) which is equal to or higher than the threshold (Step_j). If the window comparator 111 keeps outputting the sled signal (Sld_Control) which is equal to or lower than the threshold (Step_j), the frequency generator 112 generates a down pulse signal (DOWN) to drive the step motor toward an inner circumference of an optical disk, as shown in FIG. 2(d), during a period of the second window signal (PLDW) as shown in FIG. 2(c), at a predetermined interval of time (FGrate) according to the disk speed shown in FIG. 2(f). The interval of time (FGrate) can be varied according to a type and the speed of the optical disk and is previously stored in a microprocessor. Because the sled moves fast toward an outer circumference of the optical disk, as the optical disk speed increases, the interval of time (Fgrate) decreases.

Therefore, it is possible to reduce a load on the microprocessor by adjusting the interval of time (FGrate) leading to a speed of the sled moving the pickup, by varying a frequency of the optical driving system according to the type and the speed of the optical disk in the playing mode. The frequency values according to the interval of time (FGrate) are presented in Table 1.

TABLE 1

| FGrate | 000 | 001 | 010 | 011 | 100 | 101 | 110 | 111 |
|---|---|---|---|---|---|---|---|---|
| Frequency | DSP Control | 30 Hz | 60 Hz | 90 Hz | 120 Hz | 150 Hz | 180 Hz | 210 Hz |

Furthermore, parameters N, S1, and S2, i.e., a number of motion steps, an end point of an accelerating portion, and starting point of a decelerating portion, respectively, shown in FIG. 3(a), are input according to speed changes from the microprocessor to a step point controller 121 of the coarse search unit 120, so as to drive the step motor according to movements of the pickup due to operations such as track search and track jump. Then, the step point controller 121 outputs a step point (Ptr) to assign an interval of time (Vd) stored in a speed table 122. The speed table 122 outputs the interval of time (Vd) stored in a speed profile according to the step point (Ptr) to a down counter 123. The down counter 123 performs a count down of a count value corresponding to the interval of time (Vd) and increases a step count value by 1 by enabling a step counter 124, if the count down value is equal to 0.

The step point controller 121 outputs the step point (Ptr) to designate the interval of time (Vd) stored in the speed table 122 whenever the step is counted in the step counter 124. The down counter 123 performs a count down at the interval of time (Vd) designated to the speed table 122 and enables the step counter 124 again if the count down value is 0. Subsequently, an up/down pulse signal is output from the down counter 123 as shown in FIG. 3(b), indicative of whether the step motor is moved in a direction of the outer circumference or the inner circumference, at the interval of time (Vd) stored in the speed table 122. The movement of the step motor corresponds to movements of the pickup due to operations such as the track search and the track jump.

Speed changes by using the speed table 122 are shown in FIG. 3(c), in which the step motor is controlled to have an accelerating portion, a constant portion, and a decelerating portion in a coarse search. Each portion is determined by an end point (S1), a starting point (S2), and a number of motion step counts according to a number of tracks which is jumped or searched (the number of motion step counts is applied to at least a long track rather one track or two tracks), respectively. Therefore, in the coarse search mode, the step pulse is generated in the interval of time stored in the speed table 122 according to a number of motion steps and a motion direction corresponding to the amount of movements of the pickup such as the track search and the track jump.

A selector 131 of a motor driving unit 130 may include a mutiplexer (MUX), for example. The selector 131 selects an up/down pulse signal (UP, DOWN) from the playing unit 110 or the coarse search unit 120, respectively, according to a driving mode signal (mode) in the playing mode or the search mode, so as to supply the signal to a vector point controller 132. The vector point controller 132 selects a vector data, according to a driving mode, (A_Data, B_Data) representing a step angle (also called the rotation amount of the step motor or a phase of the step motor) corresponding to the up/down pulse signal (UP, DOWN) selected by the selector 131 and stored in a first vector table 133 for the playing mode or a second vector table 134 for the search mode. Then, in order to convert the vector data into a current signal in a phase A or a phase B, respectively, in the step motor, the vector point controller 132 outputs the vector data to a first digital/analog converter (DAC) 135 and a second digital/analog converter (DAC) 136. The first DAC 135 and the second DAC 136 generate an analog value for the step angle corresponding to the step pulse generated in the playing unit 110 or the coarse search unit 120 according to the driving mode, and that is read by the vector point controller 132. Further, the first DAC 135 and the second DAC 136 output the exciter control signals Step_A and Step_B.

Figure 4:
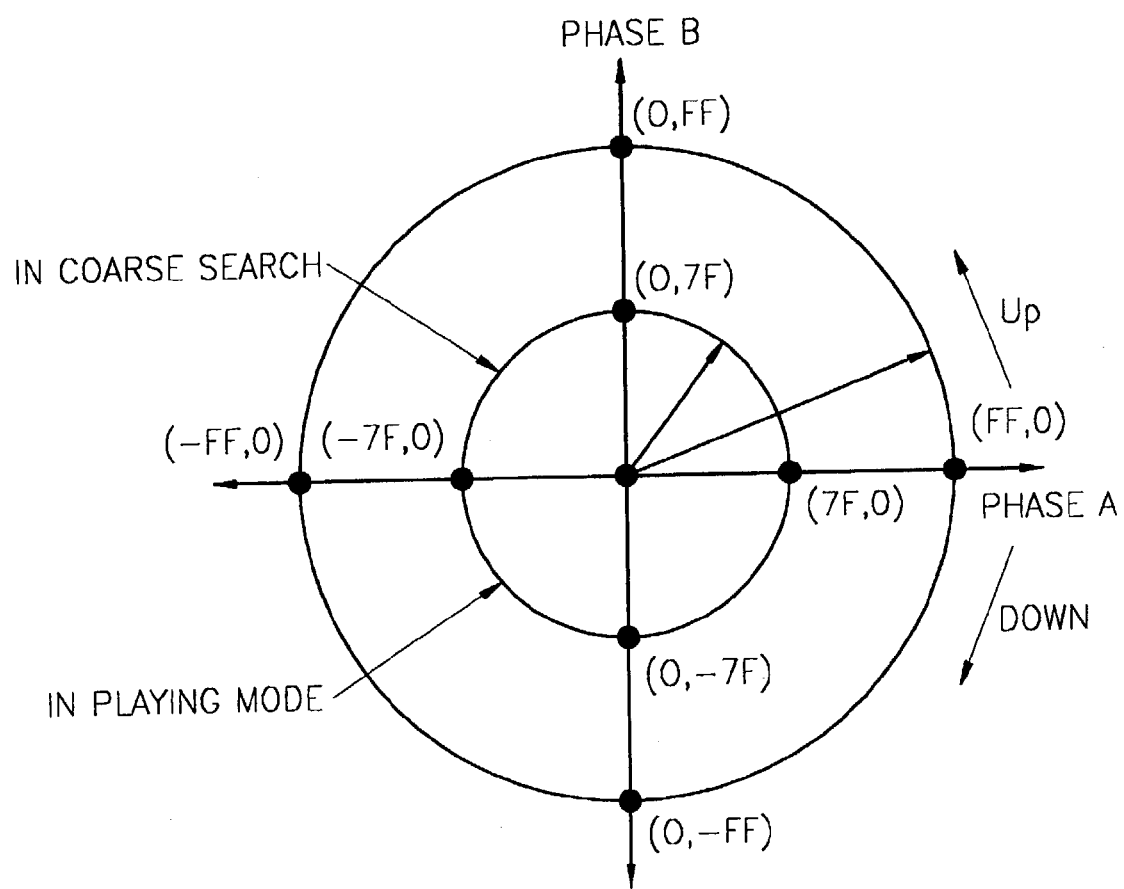
FIG. 4 is a view illustrating a principle of producing a vector table based on an output size of a step motor according to a driving mode of a motor driving unit shown in FIG. 1.

The motor driving unit 130 generates an output (a voltage) driving the step motor in a form of a multiple voltage according to the driving mode. In the playing mode, the motor driving unit 130 performs a micro step control. The step angle of the step motor means an angle of a full step with or without a current flowing in the phase A and the phase B. The micro step control controls a current capacity flowing in the phase A or the phase B, respectively, to divide an angle of a sum of vectors of the current values controlled more precisely than in the full step, thereby enabling a precise positioning control. Namely, the output (a voltage) of the step motor is controlled according to the driving mode of the step motor, i.e., according to the playing/search mode, as shown in FIG. 4.

When a rapid speed or a big torque of power is required as in the search mode (a full step), a vector data for the step angle applying an output voltage having a large value to the step motor is stored in the second vector table 134. When the step motor moves slowly as in the playing mode (a micro step) or does not move at all, a vector data for the step angle having a voltage smaller than that of data stored in the second vector table 134, which outputs the output voltage having a small value to the step motor, is stored in the first vector table 133. For example, in the coarse search mode requiring a rapid speed and a big torque as shown in FIG. 4, the second vector table 134 to control the full step, based on a circle of 8 bits (FF), is applied, while in the playing mode or in a stationary mode, the first vector table 133 to control the micro step, based on a circle of 7 bits (7F) is applied, so as to drive the step motor.

As described above, according to the present invention, it is possible to solve a problem of moving a sled more rapidly as a disk speed is higher by varying an interval of time (a frequency). Also, a load on a microprocessor can be reduced by driving a step motor using multiple voltages produced by adjusting an output voltage of the step motor according to a driving mode. Therefore, current consumption and heat generation in the step motor can be reduced, thereby an effective utilization of system power is also possible.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method to control a step motor of an optical disk driving system, the step motor moving a sled which transfers a pickup, the method comprising:
   generating a first step pulse to control the step motor in a first interval of time, wherein the first interval of time is determined by setting a playing speed according to a disk speed in a playing mode;
   generating a second step pulse in a second interval of time, where the second step pulse is stored in a predetermined speed table according to a number of motion steps, and a motion direction corresponding to movements of the pickup due to search mode operations; and
   generating a driving signal of the step motor corresponding to the first step pulse or the second step pulse according to a driving mode.

2. The method of claim 1, wherein the first interval of time is set to decrease as the disk speed increases by varying a frequency of the optical driving system according to a type of the disk or the disk speed.

3. The method of claim 1, wherein the generation of the first step pulse comprises:
   detecting a portion in which an input sled control signal is not continuously in a range of a predetermined threshold; and
   generating a step pulse indicative of a direction in which the step motor moves, in the first interval of time, according to the disk speed during the detected portion.

4. The method of claim 3, wherein the sled control signal is produced by low-pass filtering a tracking control signal.

5. The method of claim 1, wherein the generation of the second step pulse comprises:

outputting a step point according to a speed control parameter responsive to the search mode operations; and counting down an interval of time stored in a speed table having a predetermined interval of time which the step point designates, wherein the generation of the second step pulse indicates a direction in which the step motor moves at a second interval of time that is stored in the speed table, when the counting down is completed.

6. The method of claim 5, wherein the speed control parameter includes a number of motion step counts, an end point of an accelerating portion, and a start point of a decelerating portion.

7. The method of claim 1, wherein the search mode operations comprise track search and track jump.

8. A method to control a step motor of an optical disk driving system, the step motor moving a sled which transfers a pickup, the method comprising:

generating a first step pulse to control the step motor in a first interval of time determined according to a disk speed in a playing mode by using a frequency;

generating a second step pulse in a second interval of time, where the second step pulse is stored in a predetermined speed table according to a number of motion steps, and a motion direction corresponding to movements of the pickup due to search mode operations; and applying a driving signal corresponding to the first step pulse or the second step pulse to the step motor using a voltage produced by adjusting an output of the step motor according to a playing/search mode.

9. The method of claim 8, wherein the first interval of time is set to decrease as a disk speed increases by varying the frequency of the optical driving system according to a type of the disk or the disk speed.

10. The method of claim 8, wherein the generation of the first step pulse further comprises:

detecting a portion in which an inputted sled control signal keeps out of a predetermined threshold, wherein the generation of the first step pulse indicates a direction in which the step motor moves, at the first interval of time, according to the disk speed during the detected portion.

11. The method of claim 10, wherein the sled control signal is produced by low-pass filtering a tracking control signal.

12. The method of claim 8, wherein said generating a second step pulse further comprises:

outputting a step point according to a speed control parameter responsive to the search mode operations;

counting down an interval of time stored in a speed table having a predetermined interval of time which the step point designates, wherein the generation of the second step pulse indicates a direction in which the step motor moves at a second interval of time that is stored in the speed table, when the counting down is completed.

13. The method of claim 12, wherein the speed control parameter includes a number of motion step counts, an end point of an accelerating portion, and a start point of a decelerating portion.

14. The method of claim 8, wherein said applying a driving signal further comprises:

selecting the first step pulse or the second step pulse according to the playing/search mode;

reading out vector data of a step angle according to the first step pulse or the second step pulse selected from a first storage unit, where the vector data comprises a step angle to control a full step in a playing mode, or from a second storage unit, where the vector data comprises the step angle to control the full step in a search mode; and generating the vector data of the step angle read in the reading vector data into a driving signal of the step motor.

15. The method of claim 14, wherein the second storage unit stores step angle vector data having an output voltage of a predetermined large value to control the full step in the search mode requiring a rapid speed and a big torque, and the first storage unit stores the step angle vector data having an output voltage of a smaller value than the output voltage of the vector data stored in the second storage unit to control a micro step.

16. The method of claim 8, wherein the search mode operations comprise track search and track jump.

17. An optical disk driving system including a step motor moving a sled which transfers a pickup unit, the optical disk driving system comprising:

a playing unit generating a first step pulse to drive the step motor in a first interval of time, wherein the first interval of time is determined by setting a playing speed according to a disk speed in a playing mode;

a coarse search unit generating a second step pulse in a second interval of time stored in a predetermined speed table, according to a number of motion steps and a motion direction corresponding to movements of the pickup due to search mode operations; and a motor driving unit applying a driving signal corresponding to the first step pulse or the second step pulse to the step motor by using a voltage produced by adjusting an output of the step motor according to a playing/search mode.

18. The optical disk driving system of claim 17, wherein the first interval of time is set to decrease as a disk speed increases by varying a frequency of the optical driving system according to a type of the disk or the disk speed.

19. The optical disk driving system of claim 17, wherein the playing unit further comprises:

a window comparator generating a window signal by comparing an input sled control signal with a predetermined threshold and detecting a portion thereof in which the sled control signal is not continuously in a range of the threshold; and a frequency generator generating the first step pulse indicative of a direction in which the step motor moves in the first interval of time according to the disk speed during the detected portion.

20. The optical disk driving system of claim 19, wherein the sled control signal is produced by low-pass filtering a tracking control signal.

21. The optical disk driving system of claim 17, wherein the coarse search unit further comprises:

a speed table storing a predetermined speed table according to a number of motion steps and a motion direction corresponding to movements of the pickup due to the search mode operations;

a step point controller outputting a step point of the speed table according to a speed control parameter responsive to the search mode operations; and a down counter counting down an interval of time stored in the speed table having a predetermined interval of time which the step point designates, and generating the second step pulse indicative of a direction in which the step motor moves, at a second interval of time stored in the speed table whenever the counting down is completed.

22. The optical disk driving system of claim 21, wherein the coarse search unit further comprises a step counter performing a step count when a count value of the down counter is equal to zero and transmits a result indicative of the step count to the step point controller.

23. The optical disk driving system of claim 21, wherein the speed control parameter comprises a number of motion step counts, an end point of an accelerating portion, and a start point of a decelerating portion.

24. The optical disk driving system of claim 17, wherein the search mode operations comprise track search and track jump.

25. The optical disk driving system of claim 17, wherein the motor driving unit further comprises:
- a selector selecting the first step pulse generated in the playing unit or the second step pulse generated in the coarse search unit according to the playing/search mode;
- a first storage unit storing a step angle vector data to control a micro step in a playing mode;
- a second storage unit storing a step angle vector data to control a full step in a search mode;
- a vector point controller reading a step angle vector data stored in the first storage unit or the second storage unit corresponding to the first step pulse or the second step pulse selected by the selector; and
- a first digital/analog converter and a second digital/analog converter converting the step angle vector data read by the vector point controller into an exciter control signal of the step motor.

26. The optical disk driving system of claim 25, wherein the second storage unit stores step angle vector data having an output voltage of a predetermined large value to control the full step in the search mode requiring a rapid speed and a big torque, and the first storage unit stores the step angle vector data having an output voltage of a smaller value than the output voltage of the vector data stored in the second storage unit to control a micro step.

27. An apparatus to control a step motor in an optical disk driving system to move a sled which transfers a pickup unit, comprises:
- a playing unit generating a first step pulse at a first interval of time set by a disk speed according to a comparison between a sled control signal and a tracking driving signal in a playing mode with a predetermined threshold;
- a coarse search unit generating a second step pulse at a second interval of time, where the second step pulse is stored in a table according to a number of motion steps, and a motion direction corresponding to an amount of motion of the pickup unit due to operations in a search mode; and
- a driving unit driving the step motor based on the first and second step pulses.

28. The apparatus of claim 27, wherein the first interval of time is set to decrease as a disk speed increases by varying a frequency of the optical driving system according to a type of the disk or the disk speed.

29. The apparatus of claim 27, wherein the playing unit further comprises:
- a window comparator generating a window signal by comparing an input sled control signal with a predetermined threshold and detecting a portion thereof in which the sled control signal is not continuously in a range of the threshold; and
- a frequency generator generating the first step pulse indicative of a direction in which the step motor moves in the first interval of time according to the disk speed during the detected portion.

30. The apparatus of claim 29, wherein the sled control signal is produced by low-pass filtering a tracking control signal.

31. The apparatus of claim 27, wherein the coarse search unit further comprises:
- a speed table storing a predetermined speed table according to a number of motion steps and a motion direction corresponding to movements of the pickup due to the search mode operations;
- a step point controller outputting a step point of the speed table according to a speed control parameter responsive to the search mode operations; and
- a down counter counting down an interval of time stored in the speed table having a predetermined interval of time which the step point designates, and generating the second step pulse indicative of a direction in which the step motor moves, at a second interval of time stored in the speed table whenever the counting down is completed.

32. The apparatus of claim 31, wherein the coarse search unit further comprises a step counter performing a step count when a count value of the down counter is equal to zero and transmits a result indicative of the step count to the step point controller.

33. The apparatus of claim 31, wherein the speed control parameter comprises a number of motion step counts, an end point of an accelerating portion, and a start point of a decelerating portion.

34. The apparatus of claim 27, wherein the search mode operations comprise track search and track jump.

35. The apparatus of claim 27, wherein the motor driving unit further comprises:
- a selector selecting the first step pulse generated in the playing unit or the second step pulse generated in the coarse search unit according to the playing/search mode;
- a first storage unit storing a step angle vector data to control a micro step in a playing mode;
- a second storage unit storing the step angle vector data to control a full step in a search mode;
- a vector point controller reading the step angle vector data stored in the first storage unit or the second storage unit corresponding to the first step pulse or the second step pulse selected by the selector; and
- a first digital/analog converter and a second digital/analog converter converting the step angle vector data read by the vector point controller into an exciter control signal of the step motor.

36. The apparatus of claim 35, wherein the second storage unit stores the step angle vector data having an output voltage of a predetermined large value to control the full step in the search mode requiring a rapid speed and a big torque, and the first storage unit stores the step angle vector data having an output voltage of a smaller value than the output voltage of the vector data stored in the second storage unit to control a micro step.

37. The apparatus of claim 27, wherein a load on a microprocessor is reduced by driving the step motor using multiple voltages produced by adjusting an output voltage of the step motor according to a driving mode.

38. The apparatus of claim 27, wherein current consumption and heat generation in the step motor is reduced.

* * * * *